United States Patent [19]
Dirne et al.

[11] Patent Number: 5,896,253
[45] Date of Patent: Apr. 20, 1999

[54] MAGNETIC HEAD HAVING A WEAR RESISTANT LAYER SUBSTANTIALLY COMPRISING $CR_2O_3$ AND METHOD OF MANUFACTURING SUCH A MAGNETIC HEAD

[75] Inventors: Franciscus W. A. Dirne, Eindhoven; Arnold Broese Van Groenou, Waalre; Peter Lasinski; Leo-Franciscus M. Van Oorschot, both of Eindhoven, all of Netherlands

[73] Assignee: U.S. Philips Corporation, New York, N.Y.

[21] Appl. No.: 08/695,950

[22] Filed: Aug. 13, 1996

Related U.S. Application Data

[63] Continuation of application No. 08/393,595, Feb. 23, 1995, abandoned, which is a continuation of application No. 08/101,327, Aug. 2, 1993, abandoned.

[30] Foreign Application Priority Data

Aug. 3, 1992 [EP] European Pat. Off. ............ 92202392

[51] Int. Cl.⁶ .................................................... G11B 5/187
[52] U.S. Cl. ............................................................ 360/122
[58] Field of Search ................................. 360/122, 121, 360/125, 126

[56] References Cited

U.S. PATENT DOCUMENTS

| | | | |
|---|---|---|---|
| 3,665,436 | 5/1972 | Murray et al. | 360/122 |
| 4,052,748 | 10/1977 | Kuijk | 360/113 |
| 5,425,988 | 6/1995 | Ogawa et al. | 360/122 |

FOREIGN PATENT DOCUMENTS

| | | | |
|---|---|---|---|
| 0123826 | 11/1984 | European Pat. Off. | |
| 0528459 | 2/1993 | European Pat. Off. | |
| 3010348 | 9/1981 | Germany | 360/128 |
| 55-70926 | 5/1980 | Japan | 360/122 |
| 55-73917 | 6/1980 | Japan | |
| 56-19517 | 2/1981 | Japan | 360/122 |
| 56-6159820 | 12/1981 | Japan | 360/122 |
| 63-37811 | 2/1988 | Japan | |
| 63-58613 | 3/1988 | Japan | 360/122 |
| 282711 | 11/1989 | Japan | 360/122 |
| 622151 | 8/1978 | U.S.S.R. | 360/122 |

OTHER PUBLICATIONS

IBM Technical Disclosure Bulletin (vol. 7 No. 4 Sep. 1964, p. 333).

IBM Technical Disclosure Bulletin (vol. 11 No. 10 Mar. 1969, p. 1199).

IBM Technical Disclosure Bulletin (vol. 13 No. 9 Feb. 1971, p. 2759).

IBM Technical Disclosure Bulletin, vol. 11, No. 10, Mar. 1969, p. 1199.

*Primary Examiner*—Allen T. Cao
*Attorney, Agent, or Firm*—John C. Fox

[57] ABSTRACT

A magnetic head having a head face (5) and a layer structure with a transducing element (E11) and a transducing gap terminating in the head face. At the area of the transducing gap and at both sides of the transducing gap the head face is coated with a layer (31) substantially comprising $Cr_2O_3$ for forming a contact face (33) for cooperation with a record carrier. The layer substantially comprising $Cr_2O_3$ having a thickness in the range between 10 and 100 nm is preferably provided by reactive RF sputtering.

3 Claims, 2 Drawing Sheets

MAGNETIC HEAD HAVING A WEAR RESISTANT LAYER SUBSTANTIALLY COMPRISING CR$_2$O$_3$ AND METHOD OF MANUFACTURING SUCH A MAGNETIC HEAD

This is a continuation of application Ser. No. 08/393,595, filed Feb. 23, 1995, abandoned, which is a continuation of Ser. No. 08/101,327, filed Aug. 2, 1993, now abandoned.

CROSS REFERENCE TO RELATED APPLICATIONS

U.S. patent application Ser. No. 08/101,519 filed concurrently, relates to a magnetic head having a wear resistant layer, and to a method of making such a head.

BACKGROUND OF THE INVENTION

The invention relates to a magnetic head having a head face and a layer structure with a transducing element.

Such a magnetic head is known from JP-A 63-37811 (herewith incorporated by reference). The known magnetic head has a thin-film structure provided on a substrate which comprises a magnetic yoke with a magnetoresistive element and a transducing gap. The magnetic head also has a head face in which the transducing gap as well as magnetic flux guides for guiding magnetic information towards the magnetoresistive element terminate. The head face of the known magnetic head is used for guiding a magnetic record carrier, particularly a magnetic tape.

In magnetic heads which have a layer structure, soft materials, notably the soft-magnetic materials of the flux guides occur along with relatively hard materials, notably the substrate materials, for example Al$_2$O$_3$/TiC. Due to the abrasive action of the record carrier moving across the head face during operation, the relatively soft materials may wear on the head face, which results in a depression of the layer structure of the head face. Such a depression results in an increase of the distance between the record carrier and the layer structure and hence a reduced information transfer from the record carrier to the magnetic head. Consequently, a long lifetime cannot be guaranteed for the known magnetic head, whose head face also serves as a contact face.

It is to be noted that it is known per se to provide wear-resistant layers on a head face in order to inhibit wear. It has been proposed in EP-A 0 123 826 (herewith incorporated by reference) to provide a bulk head with a sputtered wear-resistance layer of a metal carbide or a metal nitride which is thinner than 0.2 μm. In IBM Technical Disclosure Bulletin, vol. 11, no. 10, March 1969, page 1199 (herewith incorporated by reference) it has been proposed to provide Cr$_2$O$_3$ by means of flame plating on heat-resistant magnetic heads for forming wear-resistant layers. It has been proposed in JP-A 55-73917 (herewith incorporated by reference) to provide core limbs of permalloy comprising Cr with a layer of Cr oxide having a thickness of more than 0.5 μm and to form a layer of Cr oxide by means of sputtering on core limbs of permalloy not comprising Cr.

OBJECT AND SUMMARY OF THE INVENTION

It is an object of the invention to provide a magnetic head having a head face and a layer structure with a transducing element and a wear-resistant layer of a non-magnetic electrically insulating material constituting a contact face which is wear-resistant also at relatively low temperatures.

The magnetic head according to the invention is characterized in that the head face is coated at least at the layer structure with a layer substantially comprising Cr$_2$O$_3$ for forming a contact face, which layer has a thickness in the range between 10 and 100 nm.

The magnetic head according to the invention has a wear-resistant contact face formed by a layer substantially comprising Cr$_2$O$_3$ for cooperation with a record carrier, particularly a magnetic tape. At the defined layer thickness a favourable signal transfer from the record carrier to the transducing element is ensured. It has been found by experiment that the contact face has a satisfactory wear resistance, not only in the temperature range between 5° C. and 85° C., but also at temperatures in the range between 5° C. and −20° C. This is particularly important for magnetic heads which are used in portable apparatuses and in magnetic scanners intended for automotive uses such as car radio cassette recorders. Since the layer substantially comprising Cr$_2$O$_3$ is electrically insulating, electric short-circuit currents via the head face are prevented. If desired, the transducing element may then extend as far as the head face.

It has been found by experiment that a layer of eminent quality substantially comprising Cr$_2$O$_3$ is obtainable on the head face by providing this layer by means of sputtering. Already at layer thicknesses of less than 60 nm, high wear resistances are found to be achievable by means of sputtering. A further advantage of the sputtered wear-resistant layer substantially comprising Cr$_2$O$_3$ is that it can be formed at temperatures below 300° C. Consequently, the magnetical properties of magnetic materials present in the layer structure are not degraded when said layer is being formed. A wear-resistant layer substantially comprising Cr$_2$O$_3$ provided on the head face by means of sputtering yields a magnetic head according to the invention which supplies favourable output signals during operation and is suitable for use at relatively low temperatures and nevertheless has a long lifetime.

It has been found that the adhesion of the layer substantially comprising Cr$_2$O$_3$ is not optimal on all materials used in the layer structure of thin-film heads. An embodiment in which this drawback is obviated is characterized in that a layer substantially comprising Cr is present between the head face and the layer substantially comprising Cr$_2$O$_3$. It has been found by experiment that a layer substantially comprising Cr and having a thickness of several nanometers preferably provided by means of sputtering is sufficient to guarantee a satisfactory adhesion of the layer substantially comprising Cr$_2$O$_3$ to the head face.

The invention also relates to a method of manufacturing a magnetic head comprising a head face and a layer structure with a transducing element.

An object of the invention is to provide a simple method of manufacturing magnetic head which has a head face and a layer structure with a transducing element and which is provided with a wear-resistant layer of a non-magnetic electrically insulating material constituting a contact face which is also wear-resistant at relatively low temperatures.

The method according to the invention is characterized in that a layer substantially comprising Cr$_2$O$_3$ and having a thickness in the range between 10 and 100 nm is formed at least at the layer structure on the head face by means of sputter deposition. Sputtering preferably takes place using a chromium target, in the presence of oxygen. A simple process is thus obtained which can easily be carried out in a production environment. Sputtering, for example RF sputtering in an argon-filled space can take place without heating the magnetic head and without a bias field.

It has been found that the pressure of the oxygen does not substantially affect the composition of the wear-resistant layer substantially comprising $Cr_2O_3$ formed on the head face, provided that this pressure is not extremely low. Consequently, the properties of this wear-resistant layer are substantially independent of small process variations. Due to the reliability of the method, it is only necessary in practice to sputter until the formed layer substantially comprising $Cr_2O_3$ has a maximum thickness of about 60 nm.

In order to guarantee a satisfactory adhesion of the layer substantially comprising $Cr_2O_3$ to the head face under all circumstances, an embodiment is characterized in that oxygen is not added during sputtering until a layer substantially comprising Cr has been formed on the head face. It has been found that the oxygen can be added after the formed layer substantially comprising Cr has a maximum thickness of 20 nm at least at the layer structure.

BRIEF DESCRIPTION OF THE DRAWINGS

These and other aspects of the invention will be apparent from and elucidated with reference to the embodiments described hereinafter, and the drawing, in which.

DESCRIPTION OF THE PREFERRED EMBODIMENT

Figure 1:
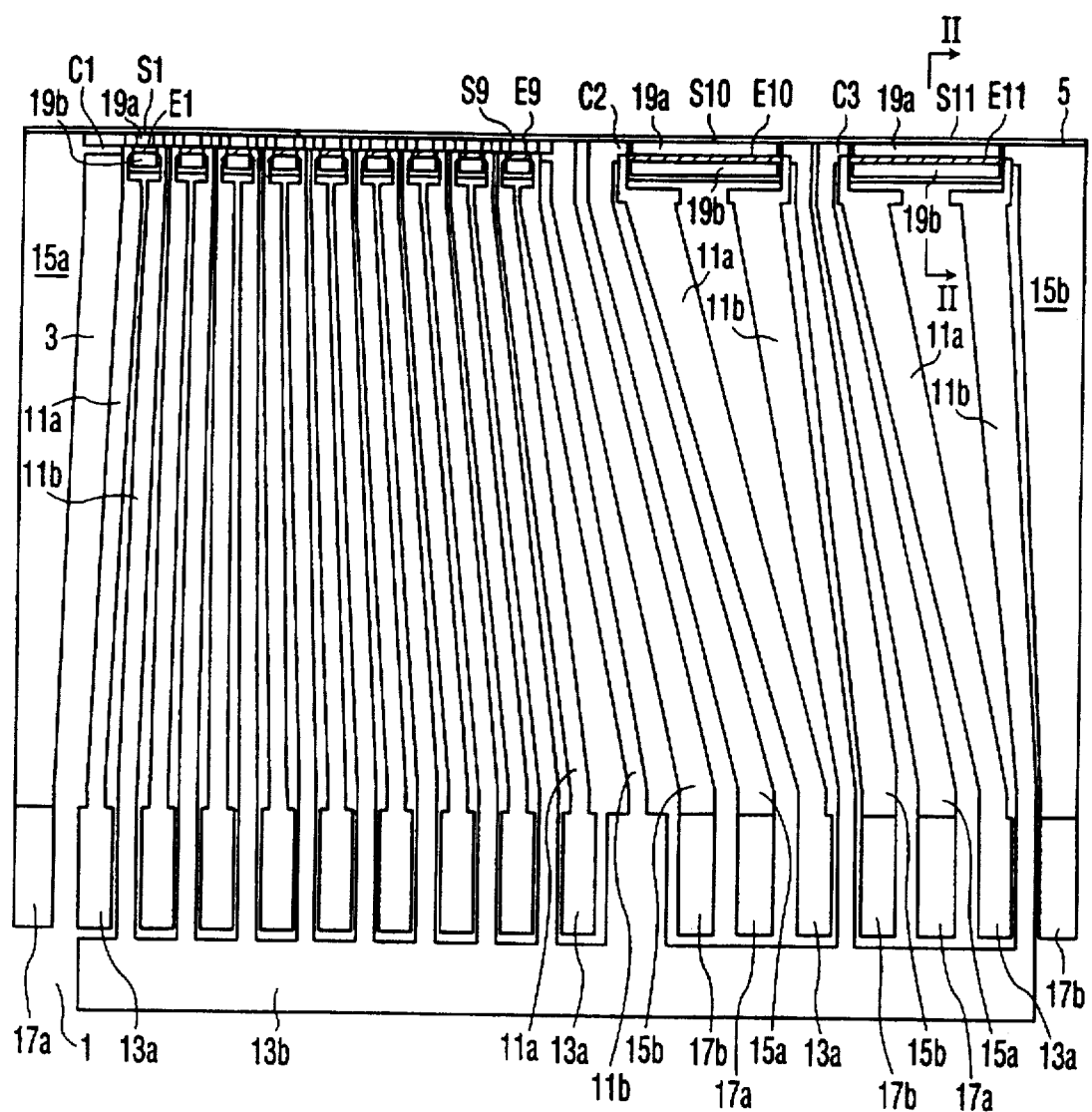
FIG. 1 is a plan view of a layout of a first embodiment of the magnetic head according to the invention.
Figure 2:
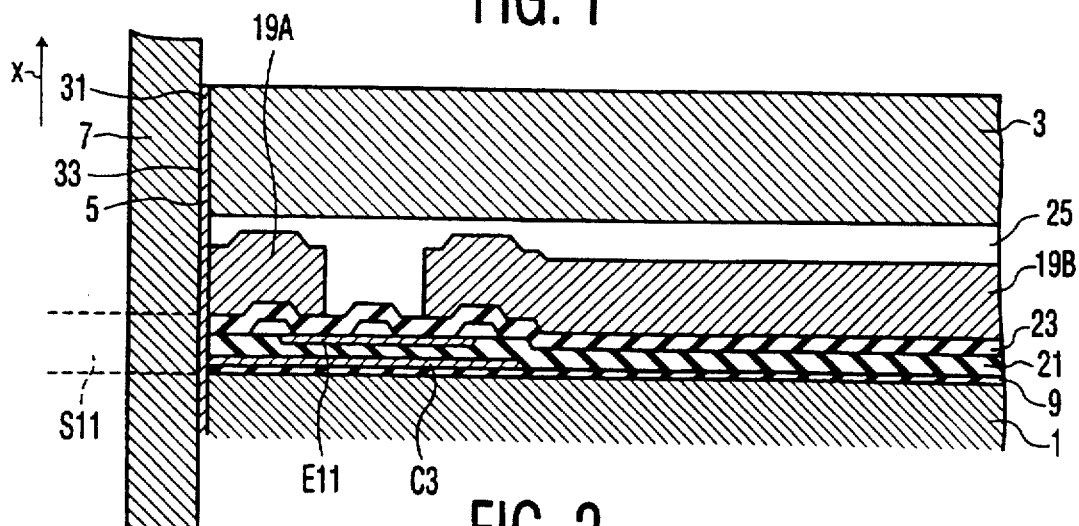
FIG. 2 is a diagrammatic cross-section taken on the line II—II through a transducing gap of the magnetic head of FIG. 1.
Figure 3:
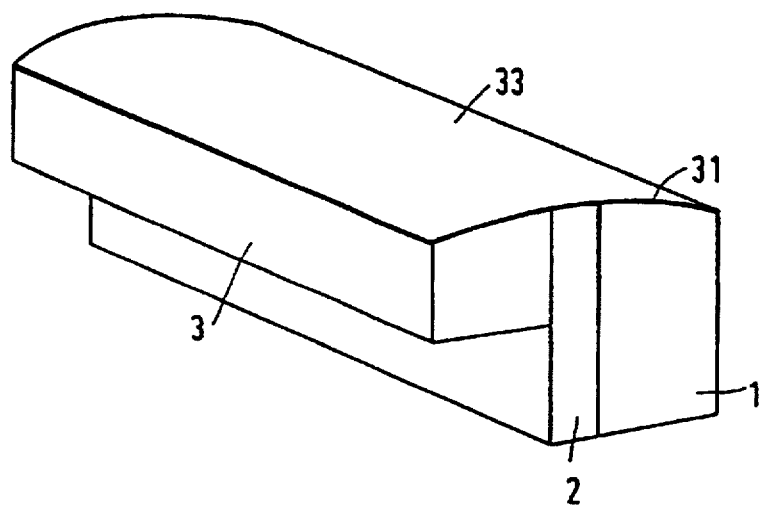
FIG. 3 is a perspective elevational view of the magnetic head of FIG. 1.

In the embodiment according to the invention shown in FIGS. 1, 2 and 3, the thin-film magnetic head comprises a support or substrate 1 of a magnetic material, viz NiZn ferrite on which a layer structure 2 composed of magnetic layers, electric layers and insulation layers is provided. The layer structure 2 is protected by a counterblock 3 of a non-magnetic material, for example $Al_2O_3/TiC$. The magnetic head has a head face 5 with eleven transducing gaps in this embodiment. A group of nine gaps S1 to S9 of the eleven transducing gaps is intended for reading information in a digital form and one pair of gaps S10 and S11 is intended for reading information in an analog form from a record carrier 7 which moves along the magnetic head in a direction x. The gaps S1 to S9 for digital use generally have a smaller gap length than the gaps S10 and S11 for analog use. The gap length may be chosen to be such that both analog and digital information can be read through one and the same gap.

In this embodiment the magnetic head according to the invention comprises an insulation layer 9 provided on the substrate 1, which layer carries three electric conductors C1, C2 and C3 which may extend into the transducing gaps. The magnetic head also comprises eleven magnetoresistive elements E1 to E11, further denoted as MR elements which comprise, for example a layer of NiFe, on which one or more equipotential strips, for example of Au, may be provided. Each MR element E1 to E11 has a pair of first connection tracks 11a and 11b which terminate in first connection faces 13a and 13b, respectively. Both the first connection tracks and the first connection faces are preferably made of Au. It is to be noted that an MR element provided with equipotential strips is known per se and is described in U.S. Pat. No. 4,052,748 (herewith incorporated by reference).

Said electric conductors C1, C2 and C3 are used to control or bias the MR elements E1 to E9, E10 and E11 and are each provided with a pair of second connection tracks 15a and 15b which terminate in second connection faces 17a and 17b, respectively.

The magnetic head also comprises eleven pairs of flux guides of a soft-magnetic material, for example NiFe or AlFeSi, each pair comprising a first or front flux guide 19a and, spaced apart therefrom, a second or rear flux guide 19b. The front flux guide 19a extends as far as the head face 5 for cooperation with the magnetic record carrier 7. The MR elements E1 to E11 are present between the substrate 1 and the flux guides, each MR element constituting a bridge between a first and a second flux guide 19a and 19b. In certain constructions and for certain uses it is possible to omit the rear flux guides. It is also possible to start from a non-magnetic substrate and to provide an extra flux guide.

The electric conductors, the MR elements and the flux guides are electrically insulated from one another by a plurality of insulation layers of an electrically and magnetically insulating material, for example an oxide or polymer. The insulation layers are denoted by the reference numerals 21 and 23 in FIG. 2. A further insulation layer 25 in the form of, for example an adhesive layer is present between the joint flux guides 19a and 19b and the counterblock 3.

A wear-inhibiting or wear-resistant layer 31 of substantially $Cr_2O_3$ is provided on the head face 5, which layer constitutes a contact face 33 for cooperation with the tape-shaped record carrier 7. The wear-resistant, non-magnetic, electrically insulating layer 31 has a thickness of 40 nm in this example. The layer 31 particularly protects the layer structure 2 from wear.

Figure 4:
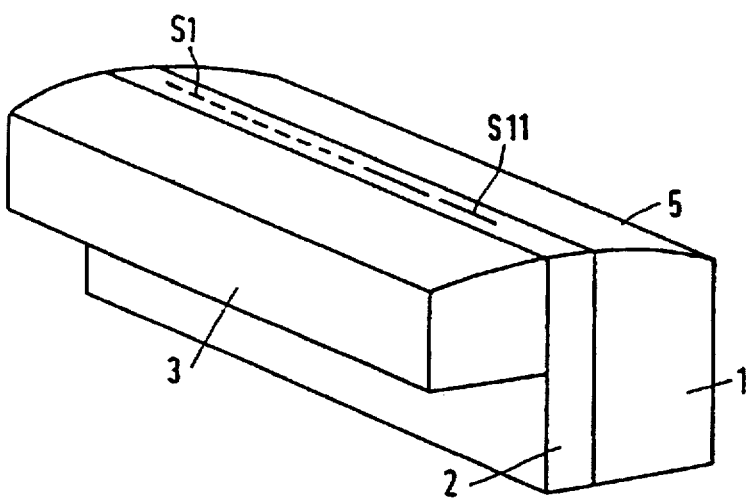
FIG. 4 is a perspective elevational view of the magnetic head of FIG. 1 in a production phase in which no wear-resistant layer has yet been provided.

With reference to FIG. 4, the method of providing the wear-resistant layer 31 on the head face will now be described. After the assembly of substrate 1, layer structure 2 and counterblock 3 has been provided with the head face 5, for example by means of grinding and/or polishing, the assembly is placed in a known sputtering device comprising a chromium target. By means of reactive RF sputtering, for example RF diode sputtering at 10 mTorr Ar and 1 mTorr $O_2$, a layer substantially comprising $Cr_2O_3$ is formed on the head face 5 at the transducing gaps S1–S11 and at both sides thereof.

Figure 5:
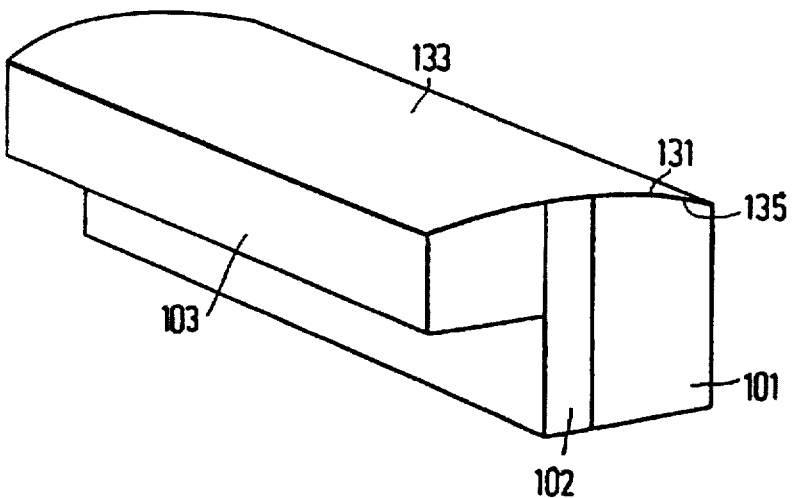
FIG. 5 is a perspective view of a second embodiment of the magnetic head according to the invention.

The magnetic head according to the invention shown in FIG. 5 comprises a substrate 101 on which a layer structure 102 and a protective block 103 are provided. A thin layer 135 substantially comprising Cr is formed by means of sputtering on the head face constituted by the substrate 101, the layer structure 102 and the protective block 103, which thin layer has a maximum thickness of 10 nm at least at the area of the layer structure 102. A layer 131 substantially comprising $Cr_2O_3$ and also formed by means of sputtering is present on the layer 135, which $Cr_2O_3$ layer has a thickness of approximately 50 nm, at least opposite the layer structure 102. Both layers may be formed in one and the same RF sputtering device of delaying the addition of oxygen until the layer 135 substantially comprising Cr has been formed.

It is to be noted that the invention is not limited to the embodiments shown. For example, the magnetic head according to the invention may comprise one or more inductive elements, for example, to form a composite read/write the magnetic head instead of or in addition to MR elements. The magnetic head may also be formed without flux guides. In the method according to the invention it is also possible to sputter with a $Cr_2O_3$ target so as to form a layer substantially comprising $Cr_2O_3$, but this is a less attractive method.

We claim:

1. A magnetic head having a head face with a layer structure with a transducing element and a transducing gap terminating in the head face, characterized in that the head face is coated, at least at the layer structure, with a layer consisting essentially of $Cr_2O_3$ and with an intermediate layer consisting essentially of Cr situated between the head face and said layer consisting essentially of $Cr_2O_3$, said layer consisting essentially of $Cr_2O_3$ having a thickness in the range of between 10 nm and 100 nm and sufficient to cover said layer structure including the transducer gap terminating in the head face.

2. A magnetic head as claimed in claim 1, characterized in that the thickness consisting essentially of the layer of $Cr_2O_3$ is between 10 and 60 nm.

3. A magnetic head as claimed in claim 1, characterized in that the layer consisting essentially of nanometers Cr has a minimum thickness of several nanometers and a maximum thickness of 20 nm.

* * * * *